United States Patent
Callot et al.

(10) Patent No.: US 8,903,692 B2
(45) Date of Patent: Dec. 2, 2014

(54) METHOD FOR THE DETECTION OF FAILURES IN A TURBOMACHINE BY MEANS OF A THEORETICAL MODEL OF THE THERMODYNAMIC CYCLE OF THE SAID TURBOMACHINE

(75) Inventors: Stanislas Callot, Paron (FR); Benoit Beaupel, Brunoy (FR)

(73) Assignee: SNECMA, Paris (FR)

( * ) Notice: Subject to any disclaimer, the term of this patent is extended or adjusted under 35 U.S.C. 154(b) by 212 days.

(21) Appl. No.: 13/398,182

(22) Filed: Feb. 16, 2012

(65) Prior Publication Data

US 2012/0215509 A1 Aug. 23, 2012

(30) Foreign Application Priority Data

Feb. 18, 2011 (FR) ...................... 11 51348

(51) Int. Cl.
*G06G 7/48* (2006.01)
*G05B 23/02* (2006.01)

(52) U.S. Cl.
CPC .................. *G05B 23/0243* (2013.01)
USPC ............................................................ 703/8

(58) Field of Classification Search
USPC ............................................................ 703/8
See application file for complete search history.

(56) References Cited

U.S. PATENT DOCUMENTS

| 2005/0262457 A1 | 11/2005 | Granier et al. |
| 2006/0126608 A1 | 6/2006 | Pereira et al. |
| 2007/0233438 A1 | 10/2007 | Quimper et al. |
| 2009/0228230 A1 | 9/2009 | Jammu et al. |

FOREIGN PATENT DOCUMENTS

| EP | 1 593 982 A1 | 11/2005 |
| EP | 2 128 765 A2 | 12/2009 |

OTHER PUBLICATIONS

French Preliminary Search Report and Written Opinion issued Sep. 6, 2011, in French 1151348, filed Feb. 18, 2011 (with English Translation of Categories of Cited Documents), 7 pages.

*Primary Examiner* — Hugh Jones
(74) *Attorney, Agent, or Firm* — Oblon, Spivak, McClelland, Maier & Neustadt, L.L.P.

(57) ABSTRACT

A method for the detection of failure in a turbomachine by monitoring the performance of the turbomachine is provided. The method includes measuring at least one performance parameter of the turbomachine in order to obtain an actual signature for the performance of the turbomachine; comparing the actual signature of the turbomachine with a database of failures associating reference signatures for the performance of the turbomachine with identifiers of failure, the database of failures being obtained by the simulation of failures on the basis of a theoretical model of the thermodynamic cycle of the turbomachine; and determining the identifier of failure of the turbomachine for the actual signature.

8 Claims, 3 Drawing Sheets

METHOD FOR THE DETECTION OF FAILURES IN A TURBOMACHINE BY MEANS OF A THEORETICAL MODEL OF THE THERMODYNAMIC CYCLE OF THE SAID TURBOMACHINE

BACKGROUND OF THE INVENTION

1. Field of the Invention

The invention relates to the area of turbomachines, in particular turbojet engines in aircraft.

2. Description of the Related Art

A turbojet engine conventionally comprises a plurality of component parts such as a compressor, a combustion chamber and a turbine. During its operation, the turbojet engine is subjected to wear which affects its performance and may lead to the appearance of failures in one or more component parts of the turbojet engine in the event of abnormal or unforeseen wear. The turbojet engine and the aircraft are not functional in the event of a failure, which poses a problem. Failures are generally associated with phenomena of fouling, corrosion, oxidation, erosion, abrasion or even the ingestion of a foreign body, problems with measurements and problems with computers, etc.

In order to prevent the appearance of a failure, inspection operations on the turbojet engine are programmed at regular intervals. It is thus possible to detect whether one of the component parts of the turbojet engine is defective or exhibits symptoms heralding a future failure Such a method for the detection of failures is not satisfactory, since the wear in turbojet engines of the same family is variable, given that an inspection at regular intervals is not adequate. In fact, if the frequency of the inspections is too low, the risk of failure is increased. If the frequency of inspection is too high, on the other hand, an inspection step may be implemented at a time when the engine is in perfectly good condition, which is a waste of time.

Continuous monitoring, that is to say for each flight cycle of the aircraft, of the individual performance parameters of a turbojet engine in order to detect the appearance of failures in the turbojet engine at an early stage has been proposed in order to eliminate this problem.

Already familiar from the prior art is a method for the detection of failures for a turbojet engine, in which use is made of a database of known failures that have been identified throughout the life of turbojet engines belonging to the same family. By way of example, the fuel delivery rate, the speed of the turbojet engine and the temperature at the outlet from the engine have been measured by a computer mounted on the turbojet engine. In the event of the appearance of a failure in the engine, the parameters measured by the computer are stored in a database in association with an identifier of failure. By way of example, if the turbine of the turbojet engine is defective, the values for the parameters of the fuel delivery rate, the speed of the turbojet engine and the temperature at the outlet from the engine that have been measured by the computer prior to the appearance of the failure are stored in the database of failures, and in this case a failure of the turbine of the turbojet engine is associated with the aforementioned values of the parameters for the identifier of failure.

The database is created on the basis of a large number of measurements obtained by feedback in the course of flights by turbojet engines of the same family and by the analysis of the failures of the said turbojet engines. In practice, several thousands of flight hours are necessary in order to obtain a relevant database. To detect a failure of the turbojet engine at an early stage, it is sufficient to compare the values of the actual parameters for a turbojet engine with the values of the parameters in the database of failures in order to deduce the next failure of the turbojet engine by reading the identifier of failure in the database of failures.

It will be readily appreciated that the relevance of this method of detection depends on the size and the quality of the database. The greater the level of feedback, the greater the relevance of the detection of failure will be.

Such a method is thus appropriate for the standard turbojet engines that have been in service for a number of years, but is inappropriate for new turbojet engines having only a few flight hours. The expression "new turbojet engine" is used here to denote both a development of a standard turbojet engine and a turbojet engine of an entirely different type.

A further disadvantage of a method for the detection of failure according to the prior art is that it does not permit a precise indication to be given of which particular component part of the turbojet engine is defective as a consequence of the use of a reduced number of sensors on the turbojet engine while the aircraft is in flight. As a result, when a failure is detected, maintenance may be carried out on a large number of component parts of the turbojet engine although only a single component part is defective.

BRIEF SUMMARY OF THE INVENTION

In order to eliminate at least some of these disadvantages, the invention relates to a method for the detection of failure in a turbomachine by monitoring the performance of the said turbomachine, this being a method in which at least one performance parameter of the turbomachine is measured in order to obtain an actual signature for the performance of the said turbomachine, by comparing the actual signature of the said turbomachine with a database of failures linking reference signatures for the performance of the said turbomachine to identifiers of failure, the database of failures being obtained by the simulation of failures on the basis of a theoretical model of the thermodynamic cycle of the said turbomachine, and the identifier of failure for the said turbomachine being determined for the said actual signature.

The detection of failures in a turbomachine may include different types of monitoring, such as mechanical monitoring, monitoring of the oil system, monitoring of the fuel system, monitoring of the start-up sequence, monitoring of the sensors and actuators of the engine and monitoring of the performance. The present method proposes a method for the detection of failures by monitoring the performance of the said engine, that is to say the thermodynamic and mechanical quantities of the said turbomachine.

The database of failures is thus obtained without recourse to empirical data which necessitate several thousands of hours of operation of the turbomachine. Furthermore, since the reference signatures are based on a precise theoretical model of the turbomachine, a failure is detected in a precise manner.

Preferably, in order to obtain an actual signature for the performance of the said turbomachine, at least one performance parameter is measured from among the following parameters: pressure, temperature or speed of the turbomachine.

Preferably, given that the turbomachine comprises a plurality of component parts, the theoretical model of the said turbomachine comprises definitions of the component parts of the said turbomachine and the state of the thermodynamic cycle of the turbomachine associated with the definitions of the said component parts. Thus, by modifying the definition of a component part, it is possible to simulate the failure of choice and to be aware of the state of the thermodynamic cycle resulting from the failure.

Preferably, a reference signature for the database of failures is calculated on the basis of thermodynamic quantities obtained from the thermodynamic cycle of the turbomachine as defined by the theoretical model of the said turbomachine, at least one component part of the turbomachine being defined in the theoretical model as being defective for the purpose of simulating a failure for which the identifier has been determined.

It is possible to deduce the thermodynamic quantities of the turbomachine for each simulated failure of the theoretical model, which permits a precise detection of the symptoms of a failure.

More preferably still, each reference signature for the database of failures corresponds to a failure of one of the component parts of the said turbomachine. The theoretical model defines each component part of the turbomachine in a precise manner, which permits the state of each component part of the engine to be known on an individual basis.

According to a preferred embodiment of the invention, the theoretical model of the turbomachine corresponds to the brochure for the turbomachine. The brochure for the turbomachine, more commonly known under its English designation as a "performance deck" or "engine cycle deck", defines the complete thermodynamic cycle of the turbomachine and defines each component part of the turbomachine in a precise manner. This brochure, which is well known to a person skilled in the art, allows the engine manufacturers to test the turbomachine in the course of its design prior to the construction of a prototype. The brochure is specific to each turbomachine of a same family and of a same type. A brochure is conventionally written according to the SAE Aerospace ARP755A and AS681G standards.

The brochure for the turbomachine is available from the design of the engine onwards, which permits a database of failures to be obtained before the turbomachine has undertaken its first flights. On completion of these flights, the brochure may be redefined on the basis of the tests undertaken in flight in order to increase the accuracy of the simulations originating from the brochure. The method for the detection of failure may thus be implemented immediately for any new turbomachine.

According to one embodiment of the invention, the reference signatures and the actual signatures each being defined in the form of a vector in an orthonormal base of thermodynamic quantities for the said turbomachine, a scalar product of the actual signature with the reference signatures is produced in order to identify the one which exhibits the greatest number of similarities with the actual signature and to deduce the identifier of failure of the said turbomachine for the said actual signature.

According to another embodiment of the invention, the reference signatures being defined for standardized operating conditions of the turbomachine, the actual signature measured under actual operating conditions is standardized with the said standardized operating conditions on the basis of the theoretical model for the said turbomachine in advance of its comparison with the database of failures. The standardization of the actual signature on the basis of the theoretical model of the said turbomachine makes it possible to eliminate any inaccuracy at the time of standardization, the operation of the turbomachine under consideration being brought back to standardized conditions (altitude, temperature, Mach number).

According to one embodiment of the invention, the method comprises a stage of construction of the database of failures on the basis of the theoretical model of the said turbomachine, the turbomachine comprising a plurality of component parts and the theoretical model comprising the definitions of the component parts of the said turbomachine and the state of the thermodynamic cycle of the said turbomachine associated with the definitions of the said component parts, this being a stage of construction of the database of failures in which the theoretical model is parameterized by modifying the definition of a component part in the theoretical model in such a way that the turbomachine simulates a failure of the said component part, the simulated failure being identified by its identifier of failure;

thermodynamic quantities resulting from the thermodynamic cycle of the turbomachine defined by the theoretical model as parameterized are calculated;

a reference signature for the said turbomachine is calculated on the basis of the said thermodynamic quantities; and the calculated reference signature is associated with the identifier of failure in the database of failures.

The database of failures is obtained in a rapid manner by simulating the desired failure for the desired component part.

BRIEF DESCRIPTION OF THE DRAWINGS

The invention will be better understood by reading the following description, which is provided solely for illustrative purposes, and with reference to the accompanying drawing, in which.

DETAILED DESCRIPTION OF THE INVENTION

The invention will be proposed for a turbojet engine of an aircraft, although the invention is applicable to any type of turbomachine such as a turbomachine for the generation of electricity.

Figure 1:
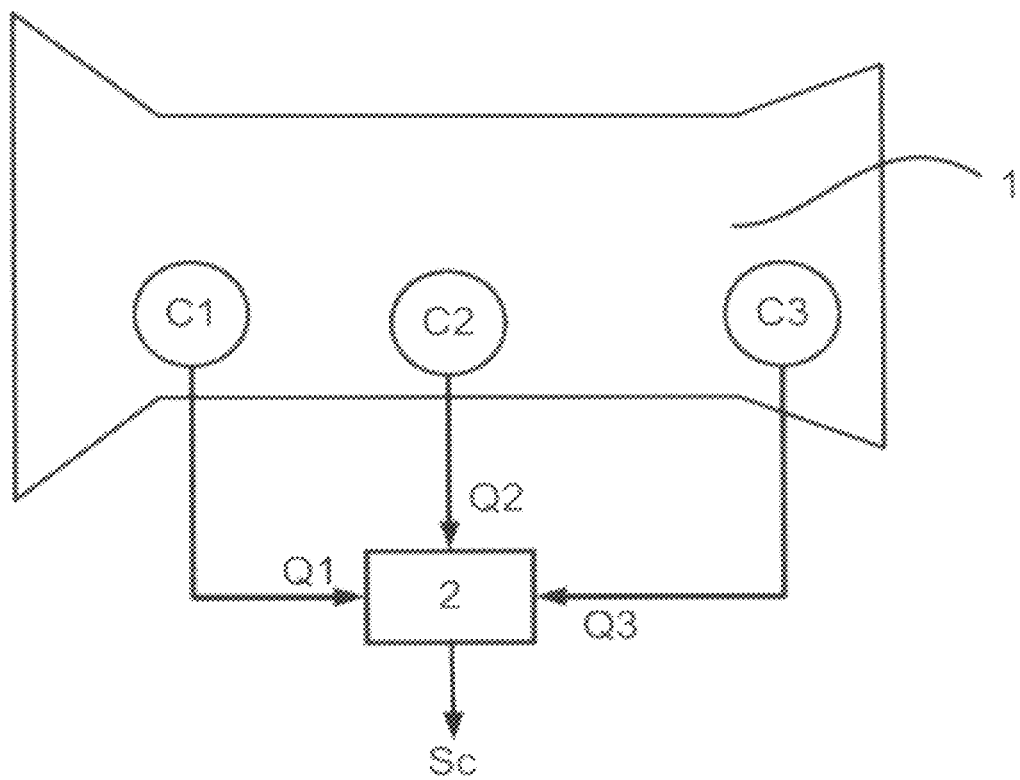
FIG. 1 is a schematic representation of the measurements of the performance parameters of a turbojet engine in an aircraft in order to obtain an actual signature.

With reference to FIG. 1, a turbojet engine 1 for aircraft comprises in a conventional manner a plurality of component parts such as a fan, a low-pressure compressor, a high-pressure compressor, a combustion chamber, a high-pressure turbine and a low-pressure turbine. In order to monitor the performance of the turbojet engine 1, a plurality of sensors C1-C3 are installed on the turbojet engine 1 and are linked to a computer 2 which processes the data measured by the sensors (FIG. 1). In this example, the computer 2 is mounted on the turbojet engine 1 in order to perform the processing of the data from the sensors C1-C3 in flight. It is self-evident that the computer 2 could also be located remotely from the turbojet engine 1, the data measured by the sensors of the turbojet engine 1 in this case being either transmitted to the computer 2 situated on the ground to be processed directly by the computer 2, or stored in a memory of the turbojet engine 1 to be processed subsequently by the computer 2. In a preferred embodiment, the data are transmitted to the computer 2 on the ground via a link of the type ACARS for an "Aircraft Communication Addressing and Reporting System".

The sensors C1-C3 of the turbojet engine 1 measure, in a continuous manner or at regular intervals, performance parameters of the turbojet engine 1, that is to say thermodynamic and mechanical quantities of the turbojet engine, these being, in this example, the temperature of the exhaust gases Q1, the fuel delivery rate Q2 and the speed of the turbojet engine Q3 (FIG. 1).

An actual signature Sc for the performance of the turbojet engine 1 is produced after acquisition of the measurements. A large number of thermodynamic parameters of the turbojet engine 1 are utilized to produce an actual signature Sc that is as representative as possible of the state of the turbojet engine 1.

Figure 3:
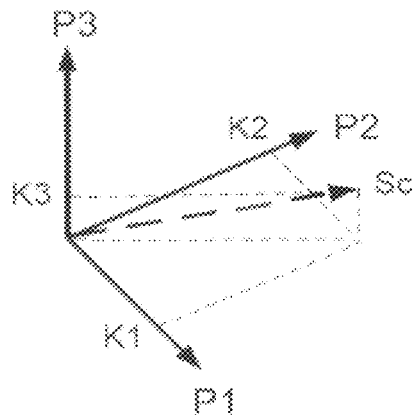
FIG. 3 represents schematically an actual signature in the form of a vector in an orthonormal base.

With reference to FIG. 3, the actual signature Sc takes the form of a vector defined in an orthonormal base of thermodynamic quantities such as the temperatures, the pressures and the speeds of rotation of the different component parts of the turbojet engine 1. It is self-evident that other thermodynamic and mechanical quantities of the turbojet engine could be added to the signature vector in order to improve the observability of the component parts of the turbojet engine. The available measurements are preferably utilized in their entirety in order to obtain an actual signature that is as relevant as possible.

By way of purely theoretical example, the orthonormal base is three-dimensional and is defined by the vectors P1, P2, P3 which correspond respectively to the temperature of the high-pressure compressor P1, the pressure of the high-pressure compressor P2 and the temperature of the high-pressure turbine P3. The actual signature Sc takes the form of a triplet Sc (K1, K2, K3), in which the values K1, K2, K3 are deduced directly or by calculation of the measurements of the performance parameters Q1-Q3 by the sensors C1-C3 of the turbojet engine 1. In fact, the combined knowledge of the temperature of the exhaust gases Q1, the fuel delivery rate Q2 and the speed of the turbojet engine Q3 permits the temperature of the high-pressure compressor K1, the pressure of the high-pressure compressor K2 and the temperature of the high-pressure turbine K3 to be calculated or deduced thanks to the utilization of a theoretical thermodynamic model of the turbojet engine, as described in detail below.

Thus, as illustrated in FIG. 3, an actual signature Sc takes the form of a vector in an orthonormal base and permits the thermodynamic state of the turbojet engine 1 to be characterized. According to a preferred embodiment, an actual signature Sc is obtained for each component part of the turbojet engine 1 in order to characterize its performance in terms of flow and efficiency.

Figure 2:
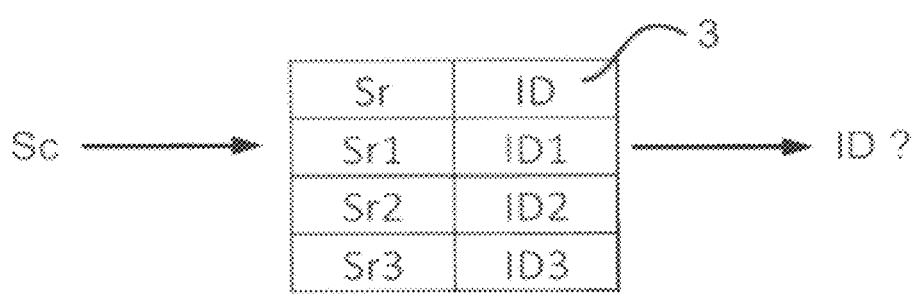
FIG. 2 is a schematic representation of the comparison of an actual signature with a database of failures in order to obtain an identifier of failure.

In order to detect whether the actual signature Sc is sound or whether it exhibits symptoms of a future failure, the actual signature Sc is compared with a database of failures 3, as illustrated in FIG. 2.

According to the invention, in order to detect the symptoms of a failure of a specific turbojet engine, a database of failures 3, or a base of failures 3, is utilized, in which reference signatures Sr, defined for a turbojet engine of the same type as the specific turbojet engine, are associated with an identifier ID of a failure of the turbojet engine, as illustrated in FIG. 2. By way of example, the base of failures 3 illustrated in FIG. 2 comprises three reference signatures Sr1-Sr3 associated with identifiers of failure ID1-ID3. Thus, by comparing the actual signature Sc of a specific turbojet engine 1 with the reference signatures Sr1-Sr3 of the base of failures 3, it is possible to deduce the identifier of failure ID of the turbojet engine and to determine whether a maintenance step intended to limit the risk of appearance of the failure should be implemented.

Figure 4:
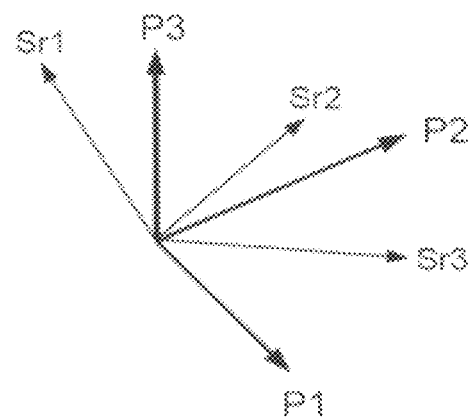
FIG. 4 represents schematically a plurality of reference signatures in the form of vectors in the orthonormal base.

In a similar manner to the actual signature Sc, each reference signature Sr takes the form of a vector defined in an orthonormal base of thermodynamic quantities. Preferably, the actual signature Sc and the reference signatures Sr are defined in the orthonormal base defined previously. With reference to FIG. 4, three reference signatures Sr1-Sr3 are represented in the orthonormal base of FIG. 3.

Figure 5:
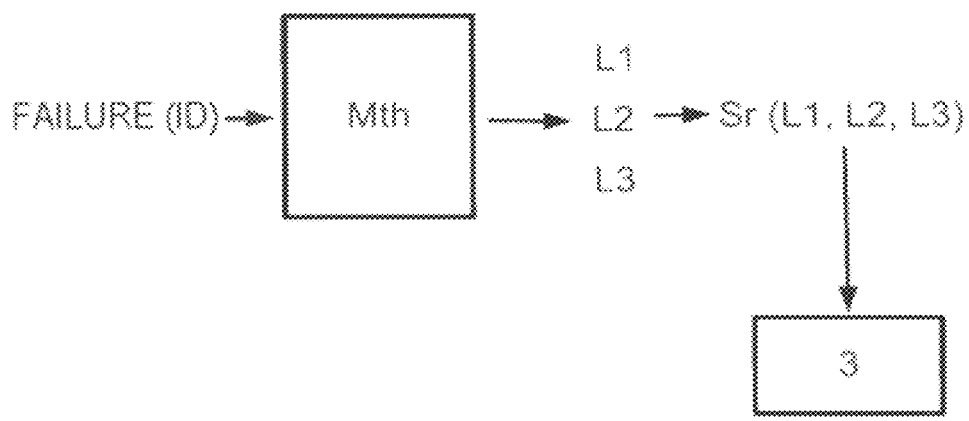
FIG. 5 is a schematic representation of the simulation of a failure on the basis of the theoretical thermodynamic model of the turbojet engine in order to deduce a reference signature.

With reference to FIG. 5, in order to obtain a reference signature Sr in the form of a triplet Sr (L1, L2, L3), a theoretical model Mth of the thermodynamic cycle of the turbojet engine 1 for which failures of the turbojet engine 1 have been simulated is utilized. The theoretical model Mth is described in more detail below. In conjunction with a simulation of failure, a specific failure (for which the identifier of failure ID is known) is created in an artificial manner in the theoretical model Mth of the turbojet engine in order to calculate the thermodynamic quantities L1-L3 of the turbojet engine 1 at the time of the occurrence of the failure, that is to say the temperature of the high-pressure compressor L1, the pressure of the high-pressure compressor L2 and the temperature of the high-pressure turbine L3. Thus, thanks to the thermodynamic quantities L1-L3 calculated with knowledge of the thermodynamic cycle of the turbojet engine 1 defined in its theoretical model Mth, it is possible to deduce the component parts of the vector forming the reference signature Sr. Once the reference signature Sr has been obtained, it is stored in the base of failures 3 by associating it with the identifier of failure ID of the simulated failure (FIG. 5).

By repeating the preceding steps, it is possible to simulate a large variety and a large number of failures and consequently to obtain a large number of reference signatures Sr. Thanks to the theoretical model Mth, it is possible to simulate the failure of choice and thus to obtain highly relevant reference signatures Sr, which make it possible on the one hand to localize the failure in a precise manner and on the other hand to detect the amplitude of the deterioration. By way of example, a reference signature Sr may indicate precisely that the high-pressure compressor is damaged and may permit the quantification of the level of deterioration. This is of considerable interest by comparison with a method for the detection of failure according to the prior art, in which a failure was localized in an imprecise manner. Furthermore, in the prior art, the amplitude of the deterioration linked to the failure was known in an approximate or even unknown manner.

Preferably, a failure relates to a single component part of the turbojet engine, which makes it possible, at the time of detection of a failure, to be aware of the state of each component part of the turbojet engine on an individual basis.

The theoretical model Mth for the turbojet engine 1 defines all of the component parts of the turbojet engine 1 (geometry, aero thermodynamic and mechanical performance, etc.) in such a way as to define in a theoretical manner the state of the thermodynamic cycle of the turbojet engine 1 associated with the definition of the said component parts. In other words, for a specific turbojet engine, the thermodynamic quantities of the turbojet engine (pressure, temperature) while the aircraft is in flight are known as a function of the definition of the component parts of the turbojet engine in the theoretical model Mth. Thus, by modifying the definition of a component part of the theoretical model Mth, for example by simulating a failure of a component part, the thermodynamic quantities of the turbojet engine 1 obtained from the theoretical model Mth are also modified.

Preferably, the theoretical model of the turbojet engine Mth is in the form of a brochure for the turbojet engine, more commonly known under its English designation as a "performance deck" or "engine cycle deck", which defines the complete thermodynamic cycle of the turbojet engine and defines each component part of the turbomachine in a precise manner. This brochure, which is well known to a person skilled in the art, allows the engine manufacturers to test the turbojet engine 1 in the course of its design prior to the construction of a prototype. The brochure is specific to each turbojet engine of a same family and of a same type. A brochure is conventionally written according to the SAE Aerospace ARP755A and AS681G standards. Given that the brochure for the turbojet engine is available before the first flight by the turbojet engine, it is not necessary to accumulate flight hours in order to produce the base of failures 3. This is advantageous on the one hand for turbojet engines whose design is new, but also for the developments of existing turbojet engines.

The invention is described below for a base of failures 3 obtained by means of the brochure for the turbojet engine, although it is self-evident that other theoretical models Mth could also be suitable.

Preferably, the base of failures 3 is defined for a turbojet engine operating under standardized conditions. By way of example, the standardized conditions are defined for a flight by the turbojet engine at 35 000 feet, for a temperature of 247 K and for a speed in the order of 0.8 Mach. It is self-evident that the standardized conditions can vary depending on the applications.

In order to detect a failure of the turbojet engine 1, the actual signature Sc of the turbojet engine is compared with the reference signatures Sr of the base of failures 3. In order to perform a relevant comparison, the actual signature Sc is standardized. In fact, the actual signature Sc results from measurements performed under actual conditions D while the turbojet engine 1 is installed in an aircraft flying at various altitudes, at various speeds and for various ambient temperatures. The thermodynamic quantities K1-K3 of the turbojet engine 1 measured under actual conditions D (not standardized) must nevertheless be standardized prior to the comparison. To this end, the theoretical model Mth of the turbojet engine 1, preferably the brochure for the turbojet engine 1, is utilized in order to calculate standardized thermodynamic quantities K1*, K2*, K3* for the actual standardized signature Sc*, as illustrated in FIG. 6.

In order to achieve this, the actual operating conditions D of the turbojet engine 1 are utilized to parameterize the theoretical model of the turbojet engine 1 according to the actual conditions $Mth_D$. The actual conditions D of the turbojet engine (speed, altitude, ambient temperature) are measured here by sensors linked to the computer 2. After parameterization of the theoretical model $Mth_D$, the thermodynamic quantities for the thermodynamic cycle of the actual theoretical model $Mth_D$ are fixed by utilizing the thermodynamic quantities K1-K3 for the turbojet engine 1 of the actual signature Sc. Thanks to the theoretical model $Mth_D$, a complete representation of the actual thermodynamic cycle of the turbojet engine 1 under the said actual conditions D is thus obtained.

Figure 6:
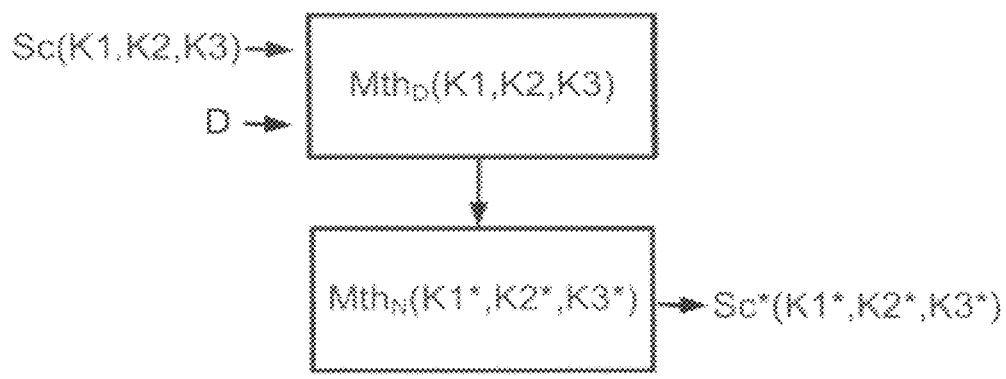
FIG. 6 is a schematic representation of the standardization of an actual signature on the basis of the theoretical thermodynamic model of the turbojet engine.
Figure 7:
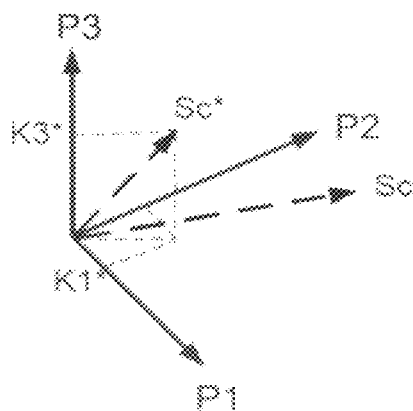
FIG. 7 represents schematically an actual standardized signature in the form of a vector in the orthonormal base.

The theoretical model $Mth_D$ is then parameterized according to the standardized operating conditions $Mth_N$ in such a way as to cause the actual thermodynamic cycle to evolve and thus to obtain the thermodynamic quantities K1*, K2*, K3* under the said standardized conditions, as illustrated in FIG. 6. The parameterization of the theoretical model $Mth_N$ under standardized conditions is preferably achieved by repetition by causing the theoretical model for the actual conditions to evolve towards the standardized operating conditions. After standardization, an actual standardized signature Sc* (FIG. 7) is obtained, which can be compared with the reference signatures Sr of the base of failures 3.

Figure 8:
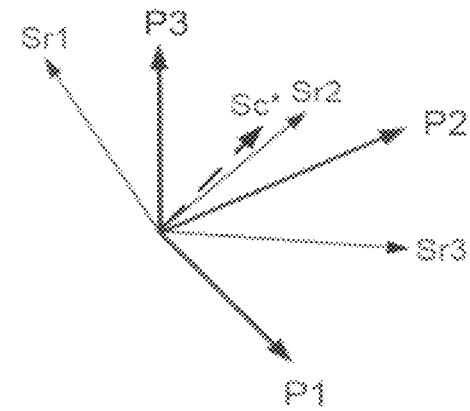
FIG. 8 represents schematically the actual standardized signature with the plurality of reference signatures in the orthonormal base.
Figure 9:
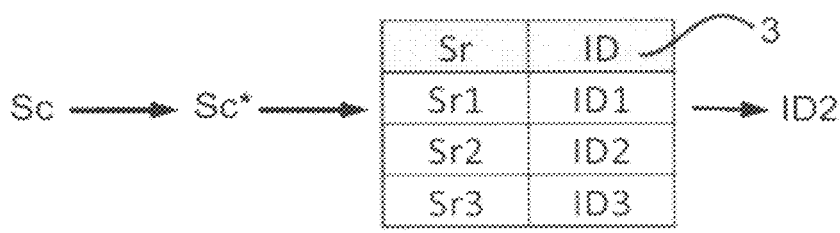
FIG. 9 represents the procedure for the detection of failure for the actual signature of FIG. 8.

In order to identify the reference signature Sr which exhibits the greatest number of similarities with the actual standardized signature Sc*, a scalar product of the actual standardized signature Sc* with the reference signatures Sr of the base of failures 3 is produced, as illustrated in FIG. 8. Given that all the signatures are defined in the same orthonormal base, the scalar product does not present any difficulty. Once the reference signature Sr has been determined in the base of failures 3, it is sufficient to read the identifier of failure ID associated with the said reference signature Sr in order to know which type of failure the turbojet engine 1 may exhibit and the amplitude of deterioration of the failure. With reference to FIG. 8, the actual standardized signature Sc* exhibits the greatest number of similarities with the reference signature Sr2. With reference to FIG. 9, by reading the base of failures 3, it can be deduced that the failure of the turbojet engine 1 is that which possesses the identifier ID2 and which corresponds, by way of example, to a minor defect in the high-pressure compressor. It is thus possible to estimate in a precise manner the period remaining until the high-pressure compressor must be removed in the course of a maintenance step. All superfluous maintenance steps are thus avoided.

Preferably, the results of the comparison can be displayed in the form of a graphical representation enabling an operator to visualize in a rapid and precise manner the localization and the amplitude of deterioration of the failures that are detected in the turbojet engine 1.

Furthermore, the quality of the comparison between the actual signature Sc and the reference signatures Sr of the base of failures 3 permits a failure to be detected in a relevant manner with a limited number of sensors C1-C3 linked to the computer 2, which is very advantageous. When the base of failures 3 comprises reference signatures Sr specific to a single component part of the turbojet engine, it is possible to identify the component parts to be replaced on an individual basis.

A failure can be localized and detected with precision in an advantageous manner by analysis of the measurements of the performance of the engine, thanks to the base of failures. The localization and the severity of the failure are known in a precise manner for any type of turbojet engine, independently of the number of flight hours completed by the said turbojet engine. The detection of failures of this kind is thus particularly advantageous for engines of a new design and for developments of existing engines.

It is possible, furthermore, to monitor the deteriorations in a turbojet engine over time in order to determine the point in time at which maintenance must be performed. It is thus possible to calculate the period of time remaining until removal of the turbojet engine becomes imperative.

The invention claimed is:

1. A method for the detection of failure for a turbomachine by monitoring the performance of the turbomachine, comprising:

measuring at least one parameter for the performance of the turbomachine;

obtaining an actual signature for the performance of the turbomachine based on the measured at least one parameter;

obtaining a database of failures associating reference signatures for the performance of the turbomachine with identifiers of failure by simulating failures based on a theoretical model of a thermodynamic model of the turbomachine;

comparing the actual signature of the turbomachine with the database of failures;

determining the identifier of failure of the turbomachine for the actual signature, wherein the obtaining the database of failures comprises:

parameterizing the theoretical model by modifying a definition of a component part of the turbomachine in the theoretical model such that the turbomachine simulates a failure of said component part, the simulated failure being identified by its identifier of failure;

calculating thermodynamic quantities obtained from the thermodynamic cycle of the turbomachine defined by the theoretical model as parameterized;

calculating a reference signature for the said turbomachine on the basis of the thermodynamic quantities; and associating the calculated reference signature with the identifier of failure in the database of failures.

2. The method according to claim 1, wherein the turbomachine comprises a plurality of component parts, the theoretical model of the turbomachine includes definitions of the component parts of the turbomachine and the state of the thermodynamic cycle of the turbomachine associated with the definitions of the component parts.

3. The method according to claim 2, wherein a reference signature for the database of failures is calculated based on thermodynamic quantities obtained from the thermodynamic cycle of the turbomachine defined by the theoretical model of the turbomachine, at least one component part of the turbomachine being defined in the theoretical model as being defective in order to simulate a failure for which the identifier is determined.

4. The method according to claim 2, wherein each reference signature of the database of failures corresponds to a failure of one of the component parts of the turbomachine.

5. The method according to claim 1, wherein the theoretical model of the turbomachine corresponds to a brochure for the turbomachine.

6. The method according to claim 1, wherein the reference signatures and the actual signatures are each defined in the form of a vector in an orthonormal base of thermodynamic quantities for the turbomachine, a scalar product of the actual signature with the reference signatures is produced in order to identify the one which exhibits the greatest number of similarities with the actual signature and to deduce the identifier of failure of the said turbomachine for the actual signature.

7. The method according to claim 1, wherein the reference signatures are defined for standardized operating conditions of the turbomachine, the actual signature measured under actual operating conditions is standardized in relation to the standardized operating conditions based on the theoretical model of the said turbomachine prior to the comparing with the database of failures.

8. The method according to claim 1, wherein results of the comparing is displayed as a graphical representation.

* * * * *

UNITED STATES PATENT AND TRADEMARK OFFICE
CERTIFICATE OF CORRECTION

| | | |
|---|---|---|
| PATENT NO. | : 8,903,692 B2 | Page 1 of 1 |
| APPLICATION NO. | : 13/398182 | |
| DATED | : December 2, 2014 | |
| INVENTOR(S) | : Stanislas Callot et al. | |

It is certified that error appears in the above-identified patent and that said Letters Patent is hereby corrected as shown below:

IN THE CLAIMS:

Column 10, line 28, change "the said turbomachine" to --the turbomachine--.

Signed and Sealed this
Eleventh Day of August, 2015

Michelle K. Lee
*Director of the United States Patent and Trademark Office*